J. W. DAVIS.
MOTOR VEHICLE.
APPLICATION FILED NOV. 4, 1908.
928,110.
Patented July 13, 1909.
3 SHEETS—SHEET 1.
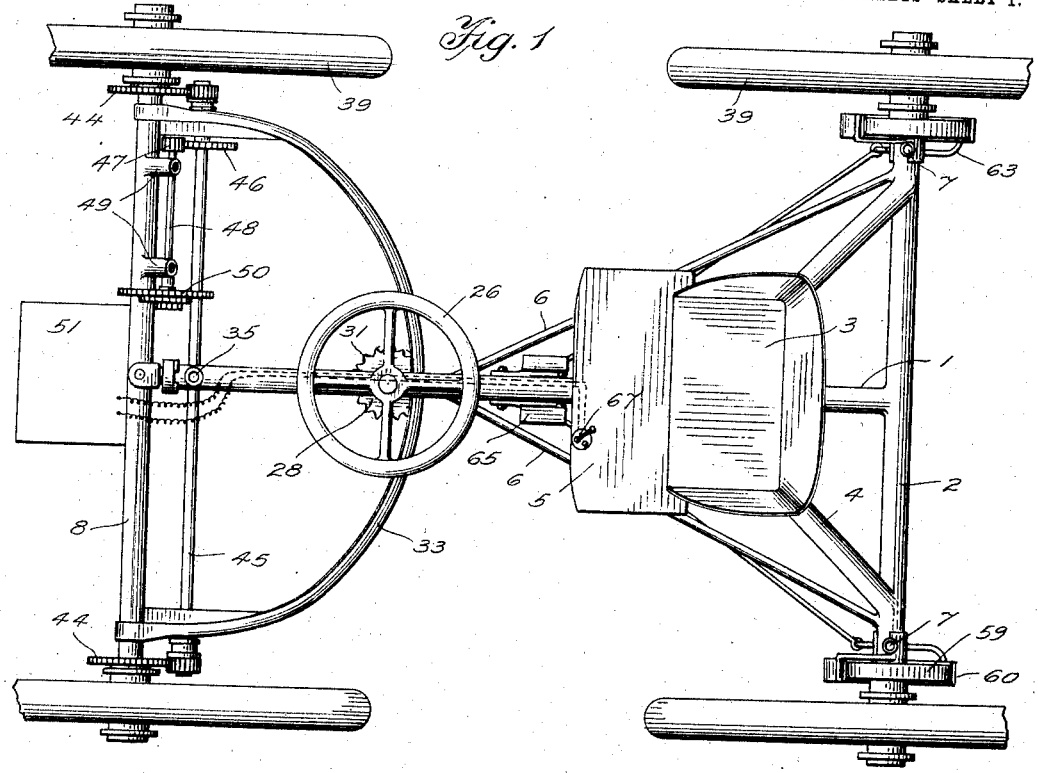
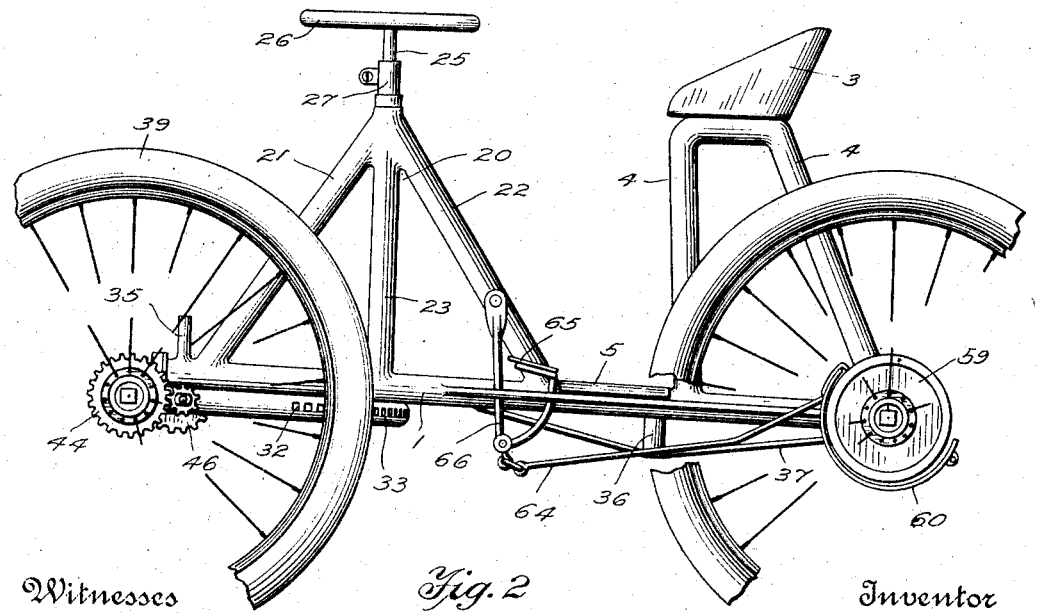
Witnesses
R. C. Claflin
Ernest R. Hutchinson
Inventor
Jesse W. Davis
By Edson Bro's
Attorneys J. W. DAVIS.
MOTOR VEHICLE.
APPLICATION FILED NOV. 4, 1908.
928,110.
Patented July 13, 1909.
3 SHEETS—SHEET 2.
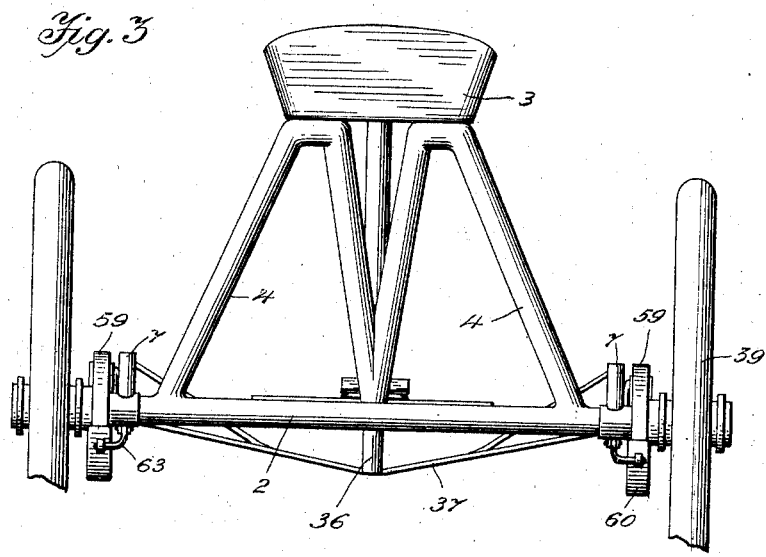
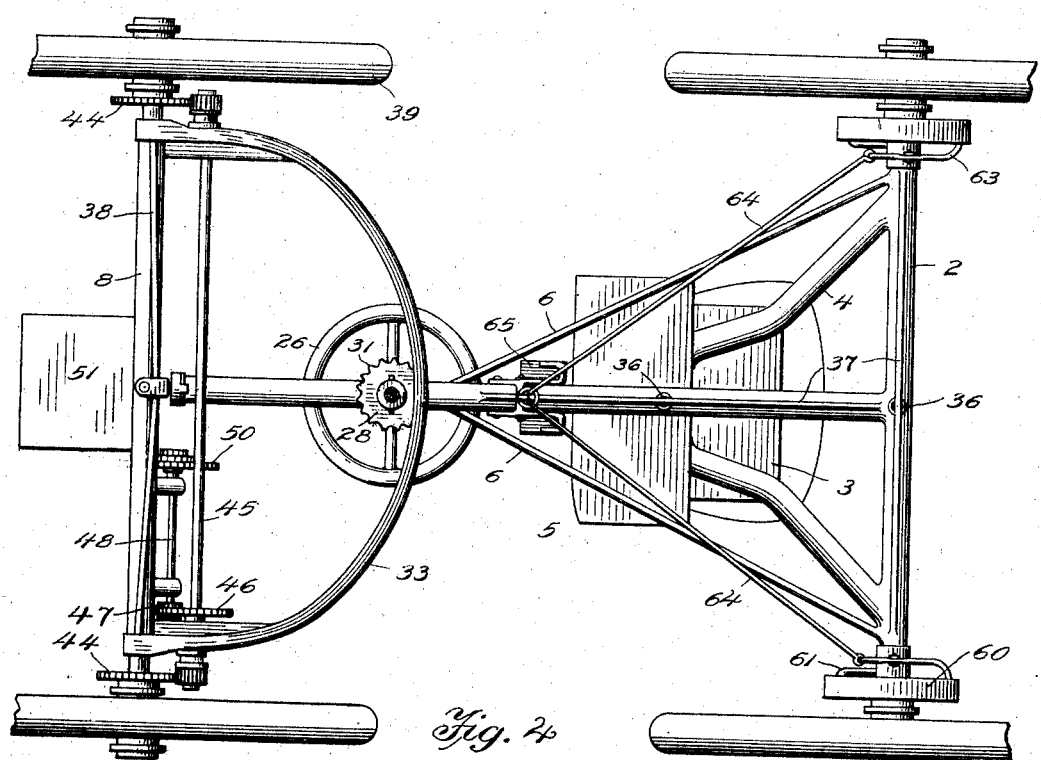
Witnesses
R. C. Claflin
Ernest P. Hutchinson
Inventor
Jesse W. Davis
By Edson Bros.
Attorneys

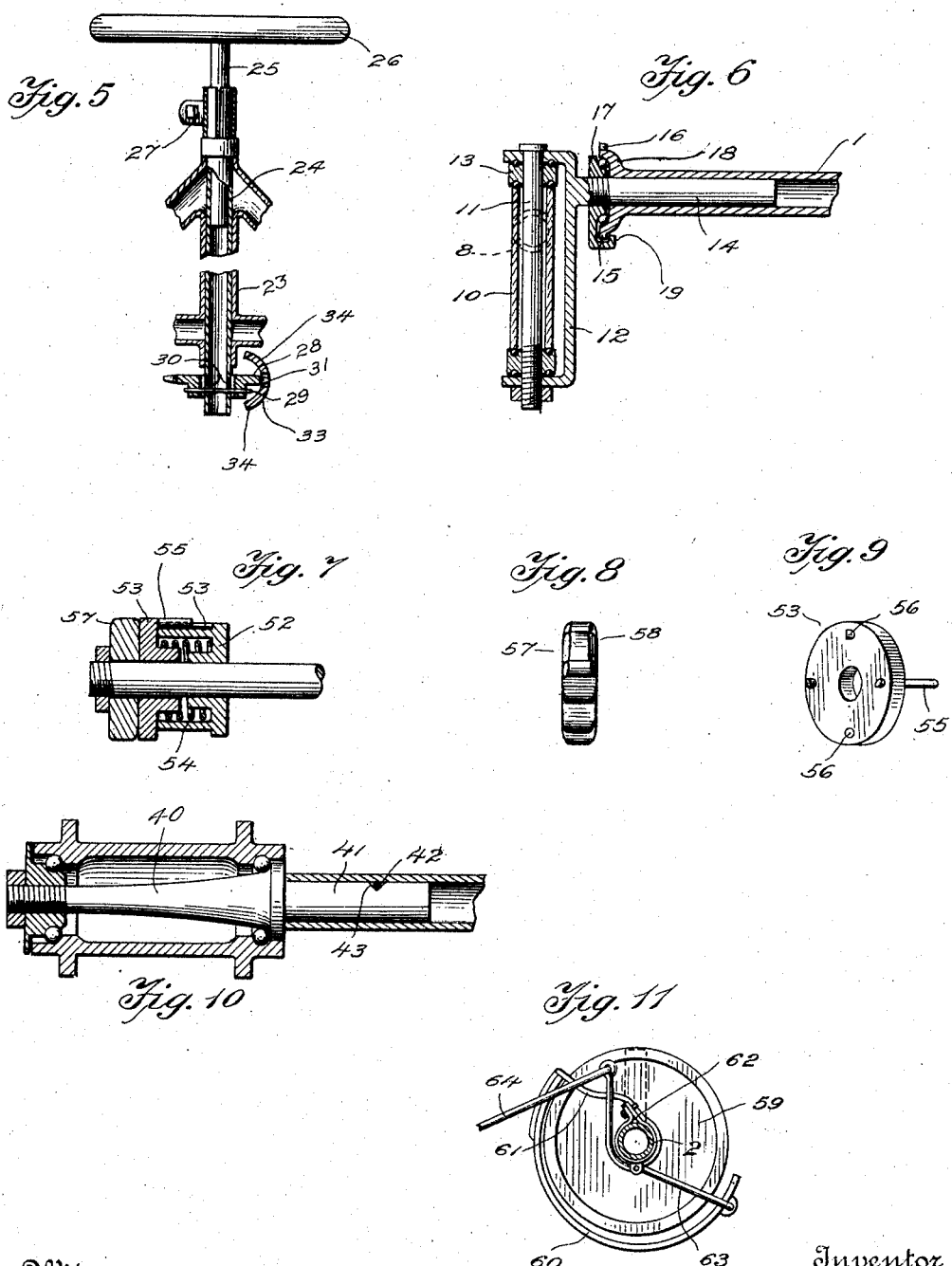

UNITED STATES PATENT OFFICE.

JESSE WISMAN DAVIS, OF MIDDLETON, TENNESSEE, ASSIGNOR OF ONE-HALF TO JOHN W. McINTYRE, OF POCAHONTAS, TENNESSEE.

MOTOR-VEHICLE.

No. 928,110.  Specification of Letters Patent.  Patented July 13, 1909.

Application filed November 4, 1908. Serial No. 461,057.

*To all whom it may concern:*

Be it known that I, JESSE WISMAN DAVIS, a citizen of the United States, residing at Middleton, in the county of Hardeman and State of Tennessee, have invented certain new and useful Improvements in Motor-Vehicles; and I do hereby declare the following to be a full, clear, and exact description of the invention, such as will enable others skilled in the art to which it appertains to make and use the same.

My invention relates to motor vehicles and particularly to the construction of the frame work, the steering gear and the driving mechanism.

It has for its object to produce a light car or runabout which is strong and durable and can be economically constructed.

Another object is to provide an improved mechanism for steering the vehicle which accommodates itself to the independent vertical movement of the wheels upon the opposite ends of either axle.

A further object is to permit of the turning of the outside wheel on the front axle faster than the inside wheel in rounding curves, both of said wheels being driven by the same motor and at the same speed.

Other objects of the invention will become apparent from the following description.

The invention consists in the features of construction and combinations of devices hereinafter described and specified in the claims.

In the accompanying drawings illustrating the preferred embodiment of my invention: Figure 1 is a top plan view of the vehicle. Fig. 2 is a side elevation. Fig. 3 is a rear elevation. Fig. 4 is an under plan view. Fig. 5 is an enlarged detailed sectional view through the supporting tube for the steering shaft showing how the hand wheel is adjustably secured to said shaft and how the sprocket wheel for engagement with the semi-circular steering bar is mounted on the lower end of said shaft. Fig. 6 is an enlarged detailed sectional view showing the connection of the reach of the main frame with the front axle. Fig. 7 is an enlarged detailed sectional view of the gear on one end of the driving shaft. Figs. 8 and 9 are enlarged detailed views of the gear itself and the ratchet disk used therewith. Fig. 10 is an enlarged sectional view of one end of the rear axle showing how the wheel spindle is mounted in the end of the tube, and Fig. 11 is a sectional view on the line $x$—$x$ of Fig. 1 showing the means for securing the brake shoe to the rear axle and the lever for operating said shoe.

In carrying out my invention, I construct the frame work almost entirely of metal tubing. The main frame comprises the reach 1 which is connected to the middle of the rear axle 2. The seat 3 for the driver is mounted preferably upon tubular supports 4 secured on the rear axle and the reach. The platform 5 is secured to the hounds 6 and extends across the reach in front of the seat. Short upright tube sections 7 are arranged near the opposite ends of the rear axle for the purpose of holding the supports of a removable top (not shown).

The front axle 8 is connected to the forward end of the reach so as to have vertical as well as horizontal pivotal movement. As illustrated in Fig. 6, a vertical tube section 10 is arranged on the front axle and through it is passed a pivot pin 11. A forked horizontally pivoting device 12 has arms extending above and below said tube section 10 and over the opposite ends of the pin 11. Ball bearing nuts 13 are preferably interposed between the opposite ends of the tube section 10 and the ends of the pivoting device 12. Said pivoting device is rigidly secured to a rearwardly extending pin 14 which is fitted into the forward end of the reach. The latter has an outwardly projecting flange 15 at its end in the upper portion of which a notch 16 is formed. The pin 14 is rotatably secured in the end of the reach by a ball bearing nut 17 engaging a collar 18 on said reach by means of a bent tongue 19 adapted to be passed through the notch 16 in the flange 15 and then turned so as to engage the inner face of said flange. It will be noted that the normal position of said tongue is at the bottom of the flange 15 whereas the notch through which it is passed for making the connection is at the top thereof. It will thus be seen that the nut on the pin must be turned completely over in order to connect or remove the front axle from the reach.

Near the forward end of the reach bar there is arranged an upwardly extending triangular frame 20 comprising forwardly and rearwardly extending braces 21 and 22, respectively, and a vertical intermediate tube 23. The steering shaft 24 is mounted in this tube and is itself made of tubular metal. The upper end of said tubular shaft is slotted to permit it to be clamped around the rod 25 which is secured to the steering wheel 26 and is adjustable vertically in said shaft. Said rod is retained at the desired height by the clamp 27 fitted around the upper slotted end of the steering shaft. On the lower end of said shaft there is mounted a sprocket wheel 28 connected thereto by means of a transverse pin 29 engaging elongated slots 30 in said shaft. The periphery of said sprocket wheel has rounded grooves cut therethrough forming short V-shaped points or teeth 31 which mesh with perforations 32 in the semicircular steering bar 33. Said steering bar is connected, as usual, at its opposite ends to the front axle but unlike previous constructions it is channeled or curved in cross section as illustrated particularly in Fig. 5. It is thus formed with upper and lower rounded flanges 34 which guide and confine the teeth of the sprocket 28 which are in engagement with the perforations in said steering bar. The pivotal connection of the sprocket upon the lower end of the steering shaft permits the former to dip or tilt to conform to the angle of the steering bar where the wheel on one end of either axle is raised above the other as when passing over an obstruction or uneven place in the road.

An upwardly extending tube section 35 is placed at the front end of the reach for holding a head light, not shown. Downwardly extending tube sections 36 are arranged at the middle of the rear axle and below the platform on the reach and under them are placed truss rods 37 for strengthening the main frame. A truss rod 38 is also placed under the tube section 10 on the front axle. Each of the wheels 39 of the vehicle is mounted on a spindle 40 having a portion 41 projecting into the end of the tubular axle and secured therein by a pin 42 passed through the axle and a notch or slot 43 in said projecting portion. The wheels are preferably mounted on ball bearings substantially as shown in Fig. 10.

Each of the front wheels carries a fixed gear wheel 44 on the inner end of its boxing. The driving shaft 45 is journaled in the steering bar and extends entirely across the same parallel to the front axle. A gear 46 mounted near one end of the driving shaft meshes with a pinion 47 on an auxiliary shaft 48 journaled in tubular uprights 49 on the front axle. The other end of said auxiliary shaft carries a variable speed gear 50 adapted to have suitable driving connection with the shaft of the motor 51 which is preferably hung from the middle of the front axle. As the connection between the motor and the auxiliary shaft is not a part of the present invention it is deemed unnecessary to further describe the same.

On each end of the driving shaft there is mounted a fixed cup shaped collar 52 provided with a projecting pin 53 at one side. A ratchet disk 53 is mounted next to the open side of the collar and is loose on said shaft. The rotation of said disk in one direction is cushioned by a coiled spring 54 arranged within said collar and connected at one end thereto and at the other end to said disk. In the other direction the rotation of said ratchet disk is limited by a projecting pin 55 on said disk engaging the pin 53 on the collar. Ratchet projections 56 on the outer face of said disk are engaged by the adjacent lateral edges of the teeth of a pinion 57 mounted on the extremity of the driving shaft and meshing with the gear wheel 44. These edges of the teeth of said pinion are beveled as at 58 so as to more readily co-act with the ratchet projections on the disk. It will be understood, of course, that these ratchet projections are faced in the proper direction for turning the pinion 57 so as to transmit power to the gear wheels to move forward. The ratchet construction permits the outside wheel on the front axle to "step up" or turn faster in going around a curve than the inside wheel, although both wheels will, of course, be driven by the same shaft at the same speed under normal conditions. The spring 54 takes up any jar which might be caused by the sudden starting of the vehicle and also relieves strain when the inside wheel is retarded in its rotation on a turn. Said ratchet and spring mechanism also gives greater freedom in turning or steering the vehicle because it insures an equal pressure on both wheels of the front axle in any position of said axle.

Each of the rear wheels carries a flanged disk 59 on one end of its boxing. A brake shoe 60 is mounted partially around said disk and one end thereof is rigidly secured to an arm 61 projecting from a clamp 62 fastened around the rear axle just inward of said disk. The other end of said shoe is fastened to a lever 63 intermediately pivoted on said clamp and having its other end connected by a rod 64 to a foot piece 65 whereby the shoe may be tightened upon the rim of said disk. Said foot piece comprises a double hanger 66 pivoted on the rearwardly extending brace of the triangular frame and straddling the reach bar. Said hangers are connected below the reach and thence bent upwardly to a position in front of and extending a little above the platform at either side of said reach. This construction permits the brakes to be applied with either foot.

Electric connections from the motor and storage batteries (not shown) are made to a foot switch 67 also mounted at the front edge of the platform whereby the motor may be started or stopped by the foot. This does not form any part of my present invention, however, so it is thought to be unnecessary to further describe the same.

I am aware that changes may be made in the constructions shown and described herein without departing from the spirit or sacrificing the advantages of my invention. I, therefore, reserve the right to make such changes as fairly fall within the scope of my invention.

I claim:

1. The combination, with a rear axle and reach rigidly connected, of a front axle pivoted to said reach so as to have universal movement, said pivotal connection comprising a fork having horizontal arms between which the front axle is pivoted to turn in a horizontal plane, said fork being provided with a rearwardly extending portion entering a cavity in the end of the reach, a flange on said reach with a notch therein, and a nut mounted on said rearwardly extending portion of the fork and having a hook-shaped tongue adapted to pass through said notch and engage said flange.

2. The combination, with the main frame of a vehicle and a universally pivoted front axle, of a semi-circular steering bar secured to the front axle and formed like a channel bar in cross section with upper and lower flanges, a vertical steering shaft mounted on the main frame and carrying a gear at its lower end which is normally arranged in a horizontal plane and meshes with said steering bar, said gear being guided between the flanges of said channeled steering bar, and means of connection between said gear and steering shaft which permits the former to dip and conform to the movement of said steering bar on the front axle.

3. The combination, with the main frame of a vehicle, and a universally pivoted front axle, of a semi-circular steering bar secured to the front axle, a vertical steering shaft mounted on the main frame and carrying a gear at its lower end which is normally arranged in a horizontal plane and meshes with said steering bar, and means of connection between said gear and steering shaft comprising a pin passed through said gear and an elongated slot in said shaft whereby the former is capable of dipping to conform to the movements of said steering bar on the front axle.

In testimony whereof, I affix my signature, in presence of two witnesses.

JESSE WISMAN DAVIS.

Witnesses:
JAMES J. CAMPBELL,
P. J. MOORE.